United States Patent Office 3,318,713
Patented May 9, 1967

3,318,713
MOLDED SEMI-VITREOUS ARTICLE AND
METHOD OF MAKING SAME
Leslie F. Pither, Maumee, Ohio, assignor to Owens-Illinois, Inc., a corporation of Ohio
No Drawing. Filed Aug. 5, 1963, Ser. No. 300,067
15 Claims. (Cl. 106—54)

This invention relates to semi-vitreous non-porous articles and to the method of molding the same. More particularly, this invention concerns molded electrically-insulating semi-vitreous articles, including the method of making the same, which are admirably suited for certain specific electronic applications.

It is necessary in those instances where glasses are to be used for certain electrical purposes, such as in the manufacture of electron tubes such as cathode-ray and television picture tubes, that the properties of the glasses be controlled within very narrow limits. More specifically, in the making of side rods for use in cathode-ray tube gun assemblies (see members 24 and 25 of U.S. Patent No. 3,085,172), it is essential that the side rods employed therein be characterized by having high electrical resistivity, low thermal expansion and freedom from seeds, as well as resistance to devitrification during the molding or manufacture thereof.

Accordingly, it is a primary object of this invention to make shaped semi-vitreous articles which are of particular utility as components of electron tubes.

A further object of this invention is to form shaped articles having excellent electrical properties by powdering a glass, adding a small amount of mineral constituent, molding the mixture with a binder under high pressure, and sintering the thus compacted mixture into a semi-vitreous non-porous rigid body.

A further object of this invention is to provide glass compositions which are particularly suitable for powdering, mixing with mineral additions, compacting, and sintering, but will not devitrify or undergo excessive thermal expansion when so treated.

These and other objects will be apparent from the description which follows.

According to the present invention, the above and other objects can be accomplished by pulverizing a glass, adding from 5 to 15% by weight of a mineral constituent, molding and sintering the mixture into final form. Table I indicates ranges of oxides which can be employed on borosilicate glasses utilized in practicing the present invention.

TABLE I

| Component: | Percent by weight |
|---|---|
| $SiO_2$ | 70–82 |
| $B_2O_3$ | 12–20 |
| $K_2O$ | 2–6 |
| $MgO$ | 1–5 |
| $R_2O_3$ | less than 1 |

In the above table, $R_2O_3$ indicates the metal oxides $Al_2O_3$ and $Fe_2O_3$ in combination.

More specifically, a suitable procedure for making the articles of the present invention, such as side rods for television tubes, is as follows. Glass of the composition set forth in Table I above is pulverized and ground until at least 70% of it will pass through a 325 mesh screen. To the powdered glass is added about 5% by weight beta-eucryptite and an organic binder, such as an aqueous solution of polyethylene glycol having a molecular weight from 4,000–20,000, amounting to about 3–7% by weight of the glass. The resulting batch of ground glass, beta-eucryptite and binder is then dried on the stainless steel trays of a Stokes dryer for a period of 12–24 hours at about 52° C. The batch is thereafter pressed in a mold of the desired contour, preferably under a pressure of 2.5–3.5 tons per square inch (p.s.i.). The pressed article is then heated at a sintering temperature of about 940° to 950° C. for about 15 to 20 minutes, or until the glass particles are fused together to form a semi-vitreous or ceramic body. The body has crystalline aggregates of the added mineral dispersed throughout the vitreous matrix. Representative articles, namely, side rods for television picture tube guns having excellent electrical resistivity, high average strength, low thermal expansion, with exterior surfaces free from seeds and blisters may be made in accordance with this invention.

Table II indicates both theoretical (Examples I and II) and actual (Example III) chemical analysis of glass compositions which have been used. Example IV indicates the actual chemical analysis of the finally sintered product comprised of 95% by weight of the glass of Example III and 5% by weight beta-spodumene.

TABLE II

| Component | Examples (percent by weight) | | | |
|---|---|---|---|---|
| | I | II | III | IV |
| $SiO_2$ | 76.35 | 77.85 | 79.2 | 78.40 |
| $B_2O_3$ | 19.38 | 17.87 | 16.6 | 16.32 |
| $K_2O+Na_2O+Li_2O$ | 2.62 | 2.62 | 2.4 | 2.94 |
| $MgO$ | 1.50 | 1.50 | 1.6 | 1.45 |
| $R_2O_3$ | .15 | .16 | .2 | .89 |
| Liquidus, °F | 1,970 | 1,930 | 100.00 | 100.00 |

The criticality of the MgO with respect to one desirable property, namely, high strength, is shown by the following comparison of chemical analysis of a glass composition of the present invention and a glass composition (A) which had been used for the same purpose, namely, to make side rods for cathode-ray emitting guns for television picture tubes:

TABLE III

| Component | Examples (percent by weight) | |
|---|---|---|
| | A | B |
| $SiO_2$ | 79.1 | 77.8 |
| $B_2O_3$ | 18.0 | 18.1 |
| $K_2O$ | 2.3 | 2.2 |
| $MgO$ | *.1 | 1.5 |
| $R_2O_3$ | .3 | .2 |
| Average Strength (p.s.i.) | 3,450 | 4,050 |

*Actually $MgO+CaO$.

In addition, the presence of the MgO improved electrical resistivity since the volume resistivity log at 350° C. was 11.2 for Composition B and only 10.3 for Composition A. Moreover, there was no sacrificing of low thermal expansion which in the case of Example B (Table III) was 28 for the range 0–300° C.

The beta-eucryptite or other mineral addition in conjunction with the glass formulations of the present invention should be of such fineness that 95% will pass through a 325 mesh screen and in addition contain less than .05% of $Fe_2O_3$ as an impurity.

It will also be apparent to those skilled in the art that binders other than polyethylene glycol, which is employed as a water solution thereof, can be used, such as gelatin dissolved in water and cellulose nitrate dissolved in amyl acetate.

Although Table I above sets forth a useable range of glass compositions that can be used with the beta-eucryptite or other mineral addition, a preferred range is as follows:

TABLE IV

| Component: | Percent by weight |
|---|---|
| $SiO_2$ | 77–79 |
| $B_2O_3$ | 16–19 |
| $K_2O+Na_2O$ | 2–3 |
| MgO | 1–2 |
| $R_2O_3$ | <.3 |

Certain modifications can be made in the compositions of the present invention. For example, beta-eucryptite ($Li_2O_3 \cdot Al_2O_3 \cdot 2SiO_2$) can be replaced by beta-spodumene ($Li_2O \cdot Al_2O_3 \cdot 4SiO_2$) which are both lithium aluminum silicates having negative coefficients of thermal expansion. Petalite ($Li_2O \cdot Al_2O_3 \cdot 8SiO_2$) which has a low coefficient of thermal expansion could also be employed as the mineral additive to control thermal expansion of the final product. Other modifications of the invention will be apparent to those skilled in the art.

Sintering, as used in this invention, relates to the art of forming glass parts to shape by dry pressing finely pulverized glass or glass and mineral mixtures in dies and under high pressure, and then firing at a temperature below the liquidus point temperature and adjacent the softening point temperature of the glass.

From the foregoing description, it will be apparent that the aims and purposes of the present invention have been accomplished as evidenced by the herein disclosed glass compositions which have been shown to be particularly suited for the exacting use of components of electronic tubes such as television tubes.

While preferred embodiments of the invention have been disclosed and described above, it is to be understood that the invention is not confined to the particular procedure or method and the specific compositions herein set forth, by way of illustration, as it is apparent that various changes and variations may be made therein by those skilled in the art without departing from the spirit of the invention as disclosed above or exceeding the scope of the claims as appended hereto.

I claim:

1. A shaped semi-vitreous article formed by compressing a finely pulverized mixture consisting of (a) a glass having a composition range of 70 to 82% $SiO_2$, 12 to 20% $B_2O_3$, 2 to 6% $K_2O$, 1 to 5% MgO, and less than 1% $R_2O_3$ plus (b) from 5 to 15% of a lithium aluminum silicate selected from the group consisting of beta-eucryptite, beta-spodumene, and petalite, and thereafter sintering the mixture into a non-porous semi-vitreous article characterized by having high electrical resistance, low thermal expansion, and high mechanical strength.

2. A shaped semi-vitreous article formed by compressing a finely pulverized mixture consisting of (a) a glass having a composition range of 70 to 82% $SiO_2$, 12 to 20% $B_2O_3$, 2 to 6% $K_2O$, 1 to 5% MgO, and less than 1% $R_2O_3$ plus (b) from 5 to 15% of a lithium aluminum silicate selected from the group consisting of beta-eucryptite, beta-spodumene, and petalite, and thereafter sintering the mixture at a temperature of about 940° to 950° C. for about 15 to 20 minutes.

3. The article of claim 2 wherein the silicate is beta-eucryptite.

4. The article of claim 2 wherein the silicate is beta-spodumene.

5. The article of claim 2 wherein the silicate is petalite.

6. A shaped semi-vitreous article formed by compressing a finely pulverizing mixture into desired shape, the mixture consisting of (a) a glass having a composition range of 77 to 79% $SiO_2$, 16 to 19% $B_2O_3$, 2 to 3% $K_2O$, 1 to 2% MgO, and less than .3% $R_2O_3$ plus (b) from 5 to 15% of a lithium aluminum silicate selected from the group consisting of beta-eucryptite, beta-spodumene, and petalite; and thereafter sintering the mixture into a non-porous semi-vitreous article characterized by having high electrical resistance, low thermal expansion, and high mechanical strength.

7. A shaped semi-vitreous article formed by compressing a finely pulverized mixture consisting of (a) a glass having a composition range of 77 to 79% $SiO_2$, 16 to 19% $B_2O_3$, 2 to 3% $K_2O$, 1 to 2% MgO, and less than .3% $R_2O_3$ plus (b) from 5 to 15% of a lithium aluminum silicate selected from the group consisting of beta-eucryptite, beta-spodumene, and petalite; and thereafter sintering the mixture at a temperature of about 940–950° C. for about 15 to 20 minutes.

8. The article of claim 6 wherein the silicate is beta-eucryptite.

9. The article of claim 6 wherein the silicate is beta-spodumene.

10. The article of claim 6 wherein the silicate is petalite.

11. A shaped semi-vitreous article formed by compressing a finely pulverized mixture consisting of (a) a borosilicate glass having a composition range of 77.8% $SiO_2$, 18.1% $B_2O_3$, 2.2% $K_2O$, 1.5% MgO, and .3% $R_2O_3$ plus (b) 5 to 15% of a lithium aluminum silicate selected from the group consisting of beta-eucryptite, beta-spodumene, and petalite; and thereafter sintering the mixture into a non-porous semi-vitreous article characterized by having high electrical resistance, low thermal expansion, and high mechanical strength.

12. The method of making semi-vitreous articles characterized by having high electrical resistivity, low thermal expansion, and high strength which comprises finely pulverizing a mixture consisting of (a) a glass having a composition range of 70 to 82% $SiO_2$, 12 to 20% $B_2O_3$, 2 to 6% $K_2O$, 1 to 5% MgO, and less than 1% $R_2O_3$ plus (b) from 5 to 15% of a lithium aluminum silicate selected from the group consisting of beta-eucryptite, beta-spodumene, and petalite, thereafter forming the pulverized mixture into the desired shape, and then sintering it into a non-porous semi-vitreous article.

13. The method of making semi-vitreous non-porous rigid articles characterized by their having high electrical resistivity, low thermal expansion and high mechanical strength, said method comprising the steps of finely pulverizing a borosilicate glass having a composition range of 77 to 79% $SiO_2$, 16 to 19% $B_2O_3$, 2 to 3% $K_2O$, 1 to 2% MgO, and less than 0.3% $R_2O_3$, uniformly mixing a physical mixture of 95 to 85% of said borosilicate glass and 5 to 15% of a finely pulverized lithium aluminum silicate selected from the group consisting of beta-eucryptite, beta-spodumene, and petalite, forming said mixture under pressure into desired shape, sintering said shape at a temperature ranging from about 940° to 950° C. for about 15 to 20 minutes to heat-soften the glass component thereof, and cooling the article into a dense non-porous semi-vitreous article.

14. A shaped semi-vitreous non-porous rigid article comprising a finely-pulverized sintered mixture of (a) from 95 to 85% by weight of borosilicate glass having a compositional range of 70 to 82% $SiO_2$, 12 to 20% $B_2O_3$, 2 to 6% $K_2O$, 1 to 5% MgO, and less than 1% $R_2O_3$ plus (b) from 5 to 15% by weight of a lithium aluminum silicate selected from the group consisting of beta-eucryptite, beta-spodumene, and petalite, said article having high electrical resistance, low thermal expansion and high mechanical strength.

15. A shaped semi-vitreous non-porous rigid article comprising a finely-pulverized sintered mixture of (a) from 95 to 85% by weight of borosilicate glass having a compositional range of 77 to 79% $SiO_2$, 16 to 19% $B_2O_3$, 2 to 3% $K_2O$, 1 to 2% MgO, and less than 0.3% $R_2O_3$ plus (b) from 5 to 15% by weight of a lithium aluminum silicate selected from the group consisting of beta-eucryptite, beta-spodumene, and petalite, said article having high electrical resistance, low thermal expansion and high mechanical strength.

References Cited by the Examiner

UNITED STATES PATENTS

| 2,844,637 | 7/1958 | Borel et al. | 106—52 |
| 3,061,664 | 10/1962 | Kegg | 106—39 |
| 3,250,631 | 5/1966 | Lusher | 106—39 |

HELEN M. McCARTHY, *Primary Examiner.*